United States Patent

Eliassaf

(10) Patent No.: US 9,002,847 B2
(45) Date of Patent: Apr. 7, 2015

(54) IDENTIFYING AN AUTO-COMPLETE COMMUNICATION PATTERN

(75) Inventor: Ofer Eliassaf, Modiin (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 436 days.

(21) Appl. No.: 13/408,203

(22) Filed: Feb. 29, 2012

(65) Prior Publication Data

US 2013/0226921 A1   Aug. 29, 2013

(51) Int. Cl.
*G06F 7/00*   (2006.01)
*G06F 17/30*   (2006.01)
*G06K 9/62*   (2006.01)

(52) U.S. Cl.
CPC .................... *G06K 9/6218* (2013.01)

(58) Field of Classification Search
CPC .............................. G06K 9/6218; G06K 9/723
USPC .................................................. 707/736, 737
See application file for complete search history.

(56) References Cited

U.S. PATENT DOCUMENTS

| | | | |
|---|---|---|---|
| 7,203,699 B2 * | 4/2007 | Bellamy ........................ 707/102 |
| 7,254,569 B2 * | 8/2007 | Goodman et al. ................ 707/1 |
| 7,343,551 B1 * | 3/2008 | Bourdev ........................ 715/224 |
| 7,519,990 B1 | 4/2009 | Xie | |
| 7,676,465 B2 * | 3/2010 | Poola ..................... 707/999.005 |
| 7,680,773 B1 * | 3/2010 | Acharya et al. ............... 707/737 |
| 7,788,370 B2 * | 8/2010 | Yugami ........................ 709/224 |
| 8,010,465 B2 * | 8/2011 | Badger et al. .................... 706/11 |
| 8,325,974 B1 * | 12/2012 | Killalea et al. ................ 382/100 |
| 8,600,968 B2 * | 12/2013 | Holenstein et al. ........... 707/706 |
| 2006/0200478 A1 * | 9/2006 | Pasztor et al. ................. 707/100 |
| 2006/0224549 A1 * | 10/2006 | Otte et al. ....................... 706/62 |
| 2007/0250930 A1 | 10/2007 | Aziz et al. | |
| 2008/0222717 A1 | 9/2008 | Rothstein et al. | |
| 2009/0019038 A1 | 1/2009 | Millett | |
| 2009/0063538 A1 * | 3/2009 | Chitrapura et al. ........... 707/102 |
| 2009/0234826 A1 * | 9/2009 | Bidlack ............................. 707/5 |
| 2011/0246880 A1 | 10/2011 | Horton et al. | |

* cited by examiner

*Primary Examiner* — Marc Somers
(74) *Attorney, Agent, or Firm* — Hewlett-Packard Patent Department

(57) ABSTRACT

A method for identifying an auto-complete communication pattern within a sequence of request entities includes grouping the request entities into a plurality of clusters according to a criterion. Clusters are removed from the plurality according to at least one of pattern analysis, a cluster size, and a cluster timing. Remaining clusters are identified as having an auto-complete communication pattern.

13 Claims, 3 Drawing Sheets

IDENTIFYING AN AUTO-COMPLETE COMMUNICATION PATTERN

BACKGROUND

Software tools for validating application performance can emulate hundreds or thousands of concurrent users applying production workloads to an application platform or environment. The emulation puts the application through the rigors of real-life user loads while collecting information from key infrastructure components. Such application performance tools apply consistent, measurable, and repeatable loads to an application under test and then use resulting data to identify scalability issues that can affect real users. An application performance tool may include a virtual user generator that can run scripts to apply the loads to the application under test. To be useful, such scripts should accurately emulate the communication patterns that will be experienced by the application in production.

DRAWINGS

DETAILED DESCRIPTION

Introduction

Auto-complete communications are utilized to provide a user typing data into a form with completion suggestions from the server. The suggestions are the server responses to queries communicated by a client. Such queries are triggered by the user typing entering data into a text field of a web page. Thus, the user is provided with a better experience when filling forms. Identifying auto-complete communications over transport protocols such as HTTP can help accurately simulate transport based scripts for load testing applications, tracking auto-complete communications during functional testing of applications, and monitoring auto-complete statistics by communication monitoring products.

Various embodiments described below were developed to identify auto-complete communication patterns within a sequence of request entities. A request entity is data taken from the request portion of a request/response pair exchanged between a client and a server. In an example, a client sends an HTTP request directed to the network address of the server, and the server communicates back to the client with an HTTP response.

In an example implementation, an auto-complete communication pattern is identified by grouping the request entities into a plurality of clusters according to a criterion. Such a criterion may require that request entities grouped into the same cluster share at least one of an identical request method, identical request domain, and identical number of request key-value pairs into the same cluster. Clusters are then removed from the plurality according to at least one of pattern analysis, a cluster size, and a cluster timing. Remaining clusters are identified as having an auto-complete communication pattern. This information, for example, can be used to help ensure that a load testing script is properly emulating desired auto-complete communication patterns.

The following description is broken into sections. The first, labeled "Environment," describes and example of a network environment in which various embodiments may be implemented. The second, labeled "Components," describes examples of physical and logical components for implementing various embodiments. The third section, labeled "Operation," describes steps taken to implement various embodiments.

Environment

Figure 1:
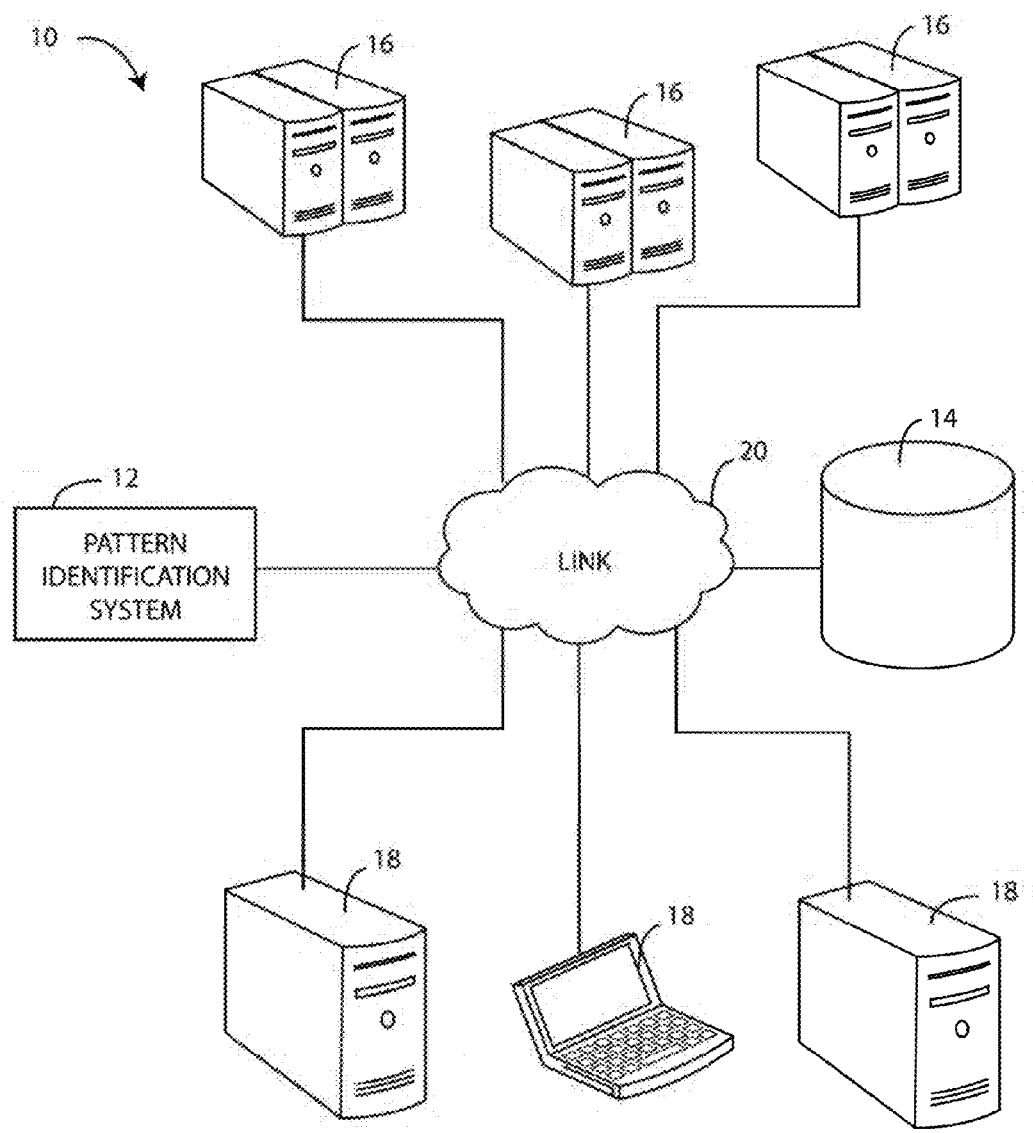
FIG. 1 depicts an environment in which various embodiments may be implemented.
Figure 2:
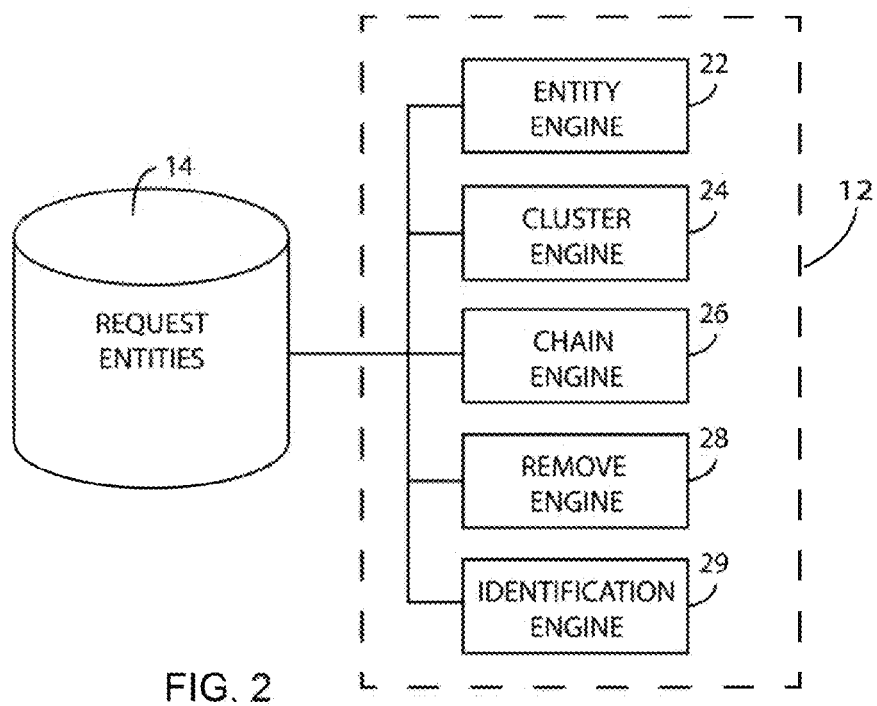
FIG. 2 depicts a system according to an example.
Figure 3:
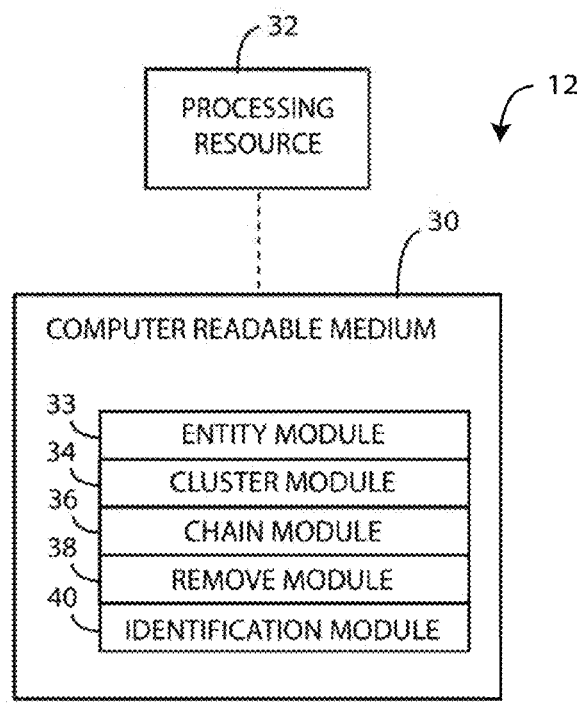
FIG. 3 is a block diagram depicting a memory and a processor according to an example.

FIG. 1 depicts an environment 10 in which various embodiments may be implemented. Environment 10 is shown to include pattern identification system 12, data store 14, server devices 16, and client devices 18. Pattern identification system 12, described below with respect to FIGS. 2 and 3, represents generally a combination of hardware and programming configured to identify an auto-complete communication pattern within a sequence of request entities. Data store 14 represents generally any device or combination of devices configured to store data for use by pattern identification system 12. Such data may include a sequence of recorded request entities.

In the example of FIG. 1, the sequence of request entities represent the request portions of the request/response pairs of network communications (such as HTTP traffic) recorded between one or more sever devices 16 and one or more client devices 18. Server devices 16 represent generally any computing devices configured to respond to network requests received from client devices 18. A given server device 16 may include a web server, an application server, or a data server. Client devices 18 represent generally any computing devices configured with browsers or other applications to communicate such requests and receive and process the corresponding responses. Link 20 represents generally one or more of a cable, wireless, fiber optic, or remote connections via a telecommunication link, an infrared link, a radio frequency link, or any other connectors or systems that provide electronic communication. Link 20 may include, at least in part, an intranet, the Internet, or a combination of both. Link 20 may also include intermediate proxies, routers, switches, load balancers, and the like.

Components

FIGS. 2-3 depict examples of physical and logical components for implementing various embodiments. FIG. 2 depicts pattern identification system 12 in communication with data store 14. Data store 14 is shown as containing a request communication entity sequence for analysis by system 12. In the example of FIG. 2, system 12 includes entity engine 22, cluster engine 24, chain engine 26, remove engine 28, and identification engine 29.

Entity engine 22 represents generally a combination of hardware and programming configured to generate a request entity for each of a sequence of requests. A request entity is data of a request communicated from a client to a server. That data includes information identifying the server as well as key-value pairs passed to the server in the request. Entity engine 22, when generating a request entity may distinguish between request methods such as GET and POST. For GET requests, entity engine 22 may simply use the request's URL as the request entity. The URL of a GET request identifies the server and includes the key-value pairs. For POST requests, entity engine 22 concatenates the key-value pairs taken from the request's body with the request's URL to generate the request entity. In either case the URL of a request entity can be said to include the entity's key-value pairs.

Cluster engine 24 represents generally a combination of hardware and programming configured to group a sequence of request entities generated by entity engine 22 into a plurality of clusters according to a criterion. As explained, each request entity includes data from a request portion of a request/response pair exchanged between a client and a server. Cluster engine 24 may operate to group selected entities into the same cluster where those entities share any of (1) an identical request method, (2) an identical request domain, and (3) an identical number of request key-value pairs. Each request identifies a domain and can also include additional data and parameters being passed via key-value pairs to the server associated with that domain. Requests that share an identical domain each refer to the same domain. Cluster engine 24 may group entities into the same cluster if the key-value pairs of the corresponding requests differ so long as the requests include the same number of key-value pairs.

As noted, each request entity includes an URL. That URL includes a domain and key-value pairs. Where the request is a GET request, those key-value pairs were originally part of a query portion of the request's URL. Where the request is a POST request, those key-value pairs are taken from the request's body and concatenated to the query portion of the request's URL. In other words, the URL of reach request entity includes a domain along with key-value pairs. Cluster engine 24 may require, for inclusion in a cluster, that the edit distance between the URL of an entity under consideration and the longest URL of an entity in the cluster be within a predetermined threshold. In other words, cluster engine 24 may compare the URLs and calculate a corresponding edit distance. An edit distance is defined as the minimum number of edits needed to transform one URL into the other, with the allowable edit operations being insertion, deletion, or substitution of a single character.

Chain engine 26 represents generally a combination of hardware and programming configured to divide each cluster into chains of consecutive request entities containing fields differing by more than one character and less than a predetermined threshold. Each key-value pair of a request entity can be referred to as a field of that entity. Restated, chain engine 26 is configured to divide the request entities of a given cluster into chains of consecutive request entities where the chains are broken by request entities that do not meet the above condition. Such a comparison of the fields of a cluster's request entities can be referred to as a pattern analysis of those entities. Chain engine 26 can then be said to function by dividing a cluster into chains of sequential request entities that exclude request entities for which the pattern analysis indicates are not auto-complete communications. Request entities that do not include a field that differs by more than one character and less than a predetermine threshold with a preceding request entity are entities for which a pattern analysis indicates are not auto-complete communications.

In an example, chain engine 26 attempts to build a chain from a cluster starting with the cluster's first request entity as the first entity in a new chain. Ultimately, chain engine 26 is looking for fields whose values contain an auto-complete query. Such fields should change from one request to its successor in at least one character and less than a predefined value. For the first entity of a chain, each of its fields is marked and compared with the fields of a subsequent entity. The fields of the subsequent entity having an edit distance in the range specified are marked. That subsequent request entity becomes a previous entity and chain engine 26 compares its marked fields with the fields of the "next" request entity. Again, the fields of that "next" request entity that differ by more than one character and less than the threshold are marked. Chain engine 26 iterates this process until no fields are marked in a "next" request entity. At this point, if chain engine 26 has identified more than a predetermined number of consecutive request entities having marked fields, those request entities are included in a chain. In an attempt to build another chain, chain engine 26 repeats the entire process above starting with the cluster's next request entity yet to be considered until none exist.

The term marked, as used herein, means that a given field of a request entity has been identified such that it is to be used in a comparison with a field of a "next" request entity. All fields of an entity used to start a chain are marked. Those fields of a subsequent request entity that, with respect to a marked field of a preceding entity, have been identified as having an edit distance with falling within the predefine range are also marked. Eventually, no fields in a "next" request entity are marked and a chain is broken or final entity of a cluster is reached.

Remove engine 28 represents generally a combination of hardware and programming configured to remove clusters from the plurality grouped by cluster engine 28 according to at least one of a cluster size, a cluster timing, and a chain analysis. Removal as used here can mean removal from later consideration by identification engine 29. Remove engine 28 may perform this function by examining the clusters and removing clusters containing less than a predefined threshold number of request entities. Remove engine 28 may remove clusters where the time elapsed between two entities in the cluster is shorter than a predetermined threshold.

Remove engine 28 may also perform its function by examining the chains of each cluster and removing a selected cluster based on that examination. For example, remove engine 28 may distinguish clusters that contain less than a predetermined threshold percentage of request entities included in a chain as well as clusters that contain:
  chains without at least one field in common;
  chains having a common field of zero length; and
  a chain having a repeating sequence of queries.
Clusters distinguished in this fashion likely do not contain request entities indicative of auto-complete communications. Remove engine 28 is then responsible for removing the distinguished clusters.

Identification engine 29 represents a combination of hardware and programming configured to identify a chain of a remaining clusters as having an auto-complete communication pattern. A remaining cluster is a cluster that remains after remove engine 28 has finished removing a cluster or clusters. Identification engine 29 can identify a chain by making details of the chain known to a user or another application. For example, a chain may be identified as having an auto-complete communication pattern by causing an update of a graphical user interface displaying details of the chain. The update may call out or otherwise highlight a display of the chain's request entities. The highlighting communicates that the corresponding entities have been identified as being part of an auto-complete communication. Identification may also be accomplished by communicating data indicative of the remaining cluster's chain via an email or other network communication.

In foregoing discussion, engines 22-29 were described as combinations of hardware and programming. Such components may be implemented in a number of fashions. Looking at FIG. 3, the programming may be processor executable instructions stored on tangible, non-transitory computer readable medium 30 and the hardware may include processing resource 32 for executing those instructions. Processing resource 32, for example, can include one or multiple processors. Such multiple processors may be integrated in a single device or distributed across devices. Medium 30 can be said to store program instructions that when executed by processor resource 32 implements system 12 of FIG. 2. Medium 30 may be integrated in the same device as processor resource 32 or it may be separate but accessible to that device and processor resource 32.

In one example, the program instructions can be part of an installation package that when installed can be executed by processor resource 32 to implement system 12. In this case, medium 30 may be a portable medium such as a CD, DVD, or flash drive or a memory maintained by a server from which the installation package can be downloaded and installed. In another example, the program instructions may be part of an application or applications already installed. Here, medium 30 can include integrated memory such as a hard drive, solid state drive, or the like.

In FIG. 3, the executable program instructions stored in medium 30 are represented as entity module 33, cluster module 34, chain module 36, remove module 38, and identification module 40 that when executed by processing resource 32 implement pattern identification system 12 (FIG. 2). Entity module 33 represents program instructions that when executed function as entity engine 22. Cluster module 34 represents program instructions that when executed function as cluster engine 24. Chain module 36 represents program instructions that when executed implement chain engine 26. Remove module 38 represents program instructions that when executed implement remove engine 28. Identification module 40 represents program instructions that when executed implement identification engine 29.

Operation

Figure 4:
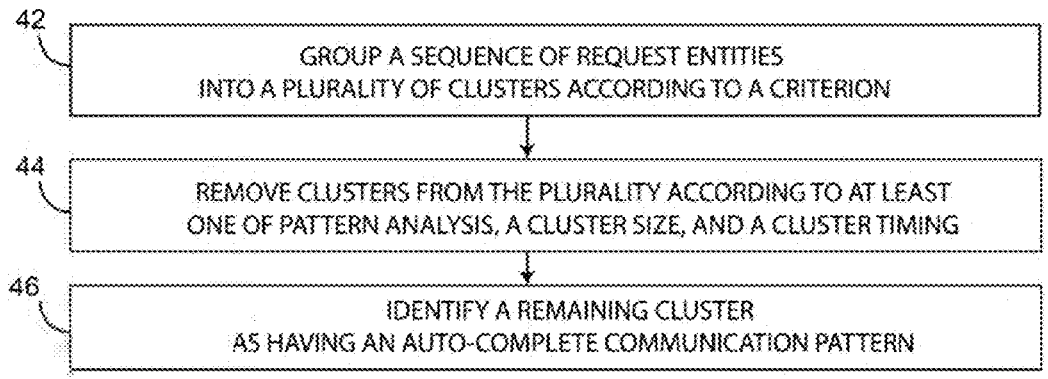
FIGS. 4-5 are flow diagrams depicting steps taken to implement examples.
Figure 5:
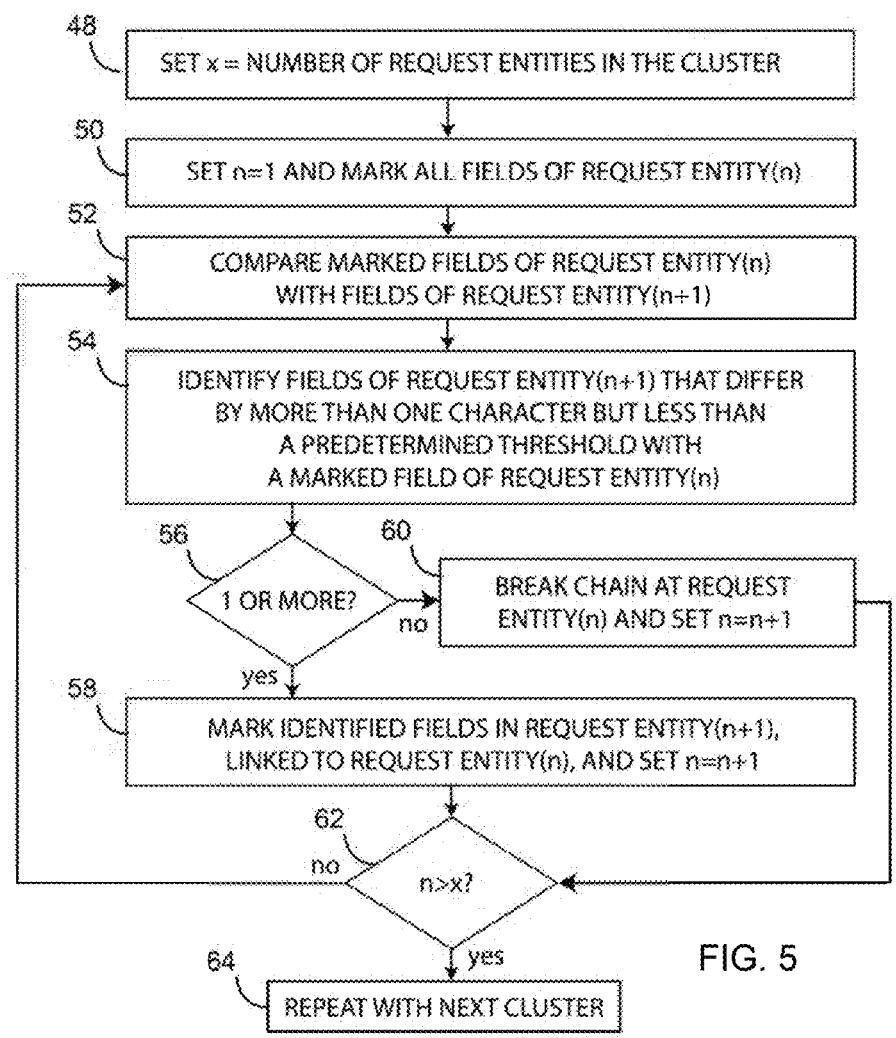

FIGS. 4 and 5 are flow diagrams depicting steps taken to implement various examples. In discussing FIGS. 4 and 5, reference may be made to the diagrams of FIGS. 1-3 to provide contextual examples. Implementation, however, is not limited to those examples. FIG. 4 is a flow diagram of steps taken to implement a method for identifying auto-complete communication patterns. FIG. 5 is a flow diagram depicting steps taken to divide a cluster into chains that can be analyzed to distinguish clusters to be removed from consideration.

Referring to FIG. 4, in step 42 a sequence of request entities is grouped into a plurality of clusters. The grouping is performed according to a criterion. For example, step 42 may include grouping request entities that share at least one of an identical request method, identical request domain, and identical number of key-value pairs into the same cluster. Grouping in step 42, may also be based on an edit distance between requests. As explained, to be included in a cluster, the edit distance between the URL of an entity under consideration and the longest URL of an entity in the cluster may be required to be within a predetermined threshold. Referring to FIG. 2, cluster engine 24 may be responsible for implementing step 42. Note that entity engine 22 may be responsible for creating the request entities from corresponding sequence of recorded requests.

Clusters are removed from the plurality established in step 42 according to at least one of a pattern analysis, cluster size, and cluster timing (step 44). Referring to FIG. 2, remove engine 28 may be responsible for implementing step 44. With respect to cluster size and cluster timing, clusters having less than a threshold number of request entities and clusters where the time elapsed between two of the cluster's entities is shorter than a predetermined threshold may be removed.

For removal based on a pattern analysis, each cluster may be divided into chains of sequential request entities that exclude request entities for which a pattern analysis indicates are not auto-complete communications. The chains of each cluster can then be examined and a selected cluster can be removed based on that examination. Referring to FIG. 2, chain engine 24 may be responsible for dividing the clusters into chains, and remove engine 26 for examining the chains and removing a cluster based on the examination.

The chains of request entities of a given cluster exclude those request entities that a pattern analysis reveals are not auto-complete communications. The pattern analysis may be accomplished by calculating edit distances between the fields of sequential request entities. As noted above, each key-value pair of a request entity can be referred to as a field. Thus, chains of consecutive request entities containing fields differing by more than one character and less than the predetermined threshold are assembled. The chains of a cluster are broken by a request entity not having a field that meets the above condition. A more detailed example of chain construction is explained below with respect to FIG. 5.

Removal in step 44 can then include examining the assembled chains and distinguishing clusters that contain less than a predetermined threshold percentage of request entities included in a chain as well as clusters that contain (a) chains without at least one field in common, (b) chains having a common field of zero length, and (c) a chain having a repeating sequence of queries. Such distinguished clusters are removed from consideration.

Any remaining cluster—that is, any cluster not removed in step 44—is then identified as having a auto-complete communication pattern (step 46). Where, a cluster is divided into chains, step 46 can include identifying a chain of a remaining cluster as having an auto-complete communication pattern. Referring to FIG. 2, identification engine 30 may be responsible for implementing step 46. Identification in step 46 can include making details of the cluster or chain known to a user or another application. Such may be accomplished by causing a graphical user interface to display information related to the cluster or chain. For example, the user interface displaying the sequence of request entities may highlight those entities included in the given cluster or chain. Identification may also be accomplished by communicating data inactive of the remaining cluster or chain via an email or other network communication.

Moving to FIG. 5, steps taken to assemble chains from a cluster created in step 42 of FIG. 4 are described. Initially, a variable (x) is set to the number of request entities in the cluster (step 48). A variable (n) is set to one, and all fields of request entity(n) are marked (step 50). It is noted that the term marked, as used herein, means that a given field of a request entity has been identified to be compared with a field in a subsequent entity.

The marked fields of request entity(n) are compared with the fields of request entity(n+1) (step 52). Based on the comparison, fields of request entity(n+1) that differ by more than one character but less than a predetermined threshold with a marked field of request entity(n) are identified (step 54). A determination is made as to whether one or more fields are identified in step 54 (step 56). Upon a positive determination, the identified one or more fields in request entity are marked, request entity(n+1) is linked to request entity(n), and the variable (n) is incremented by one (step 58). If, in step 56, a determination that one or more fields were not identified in step 54, the chain is broken at request entity(n) and the variable (n) is incremented by one (step 60).

Following step 58 or 60, a determination is made as to whether the variable(n) exceeds the variable(x) (step 62). Upon a positive determination, the last request entity of the cluster has been analyzed and the above process may repeat with the next cluster (step 64). Upon a negative determination in step 62, the processes jumps back to step 52 in an attempt to either continue a chain or start a new chain based on the determination made in step 56.

To summarize, the steps taken in FIG. 5 operate to compare a prior request entity with a subsequent request entity. A prior entity is an entity the immediately precedes the subsequent request entity in a sequence of request entities. Only those fields of the subsequent request entity having an edit distance greater than one and less than a predetermined threshold with a marked field of the prior or preceding request entity are marked. If fields of the subsequent request entity are marked, the subsequent request entity is included in a chain with the prior request entity and the steps of comparing and marking are repeated with the subsequent request entity being treated as the prior request entity in an attempt to grow the chain with another subsequent request entity. If no fields are marked, a chain is ended with the prior request entity and the steps of comparing and marking are repeated with the subsequent request entity being treated as the prior request entity in an attempt to start another chain.

It is noted that when a chain is broken at step 60, that chain may be disregarded for future analysis if it includes less than a predetermined threshold number of request entities. In other words, to create a valid chain, at least a minimum number of request entities may be required to be linked in step 58. Once all clusters have been divided into chains using the process of FIG. 5, those chains can be analyzed and clusters removed in step 44 of FIG. 4 based on that analysis. Referring to FIG. 2, the steps of FIG. 5 may be implemented by chain engine 26.

CONCLUSION

FIGS. 1-3 depict the architecture, functionality, and operation of various embodiments. In particular, FIGS. 2-3 depict various physical and logical components. Various components are defined at least in part as programs or programming. Each such component, portion thereof, or various combinations thereof may represent in whole or in part a module, segment, or portion of code that comprises one or more executable instructions to implement any specified logical function(s). Each component or various combinations thereof may represent a circuit or a number of interconnected circuits to implement the specified logical function(s).

Embodiments can be realized in any computer-readable medium for use by or in connection with an instruction execution system such as a computer/processor based system or an ASIC (Application Specific Integrated Circuit) or other system that can fetch or obtain the logic from computer-readable medium and execute the instructions contained therein. "Computer-readable medium" can be any non-transitory storage medium that can contain, store, or maintain a set of instructions and data for use by or in connection with the instruction execution system. A computer readable medium can comprise any one or more of many physical, non-transitory media such as, for example, electronic, magnetic, optical, electromagnetic, or semiconductor media. More specific examples of a computer-readable medium include, but are not limited to, a portable magnetic computer diskette such as floppy diskettes, hard drives, solid state drives, random access memory (RAM), read-only memory (ROM), erasable programmable read-only memory, flash drives, and portable compact discs.

Although the flow diagrams of FIGS. 4 and 5 show specific orders of execution, the order of execution may differ from that which is depicted. For example, the order of execution of two or more blocks or arrows may be scrambled relative to the order shown. Also, two or more blocks shown in succession may be executed concurrently or with partial concurrence. All such variations are within the scope of the present invention.

The present invention has been shown and described with reference to the foregoing exemplary embodiments. It is to be understood, however, that other forms, details and embodiments may be made without departing from the spirit and scope of the invention that is defined in the following claims.

What is claimed is:

1. A method for identifying an auto-complete communication pattern within a sequence of request entities, comprising:
   grouping the request entities into a plurality of clusters according to a criterion;
   removing a cluster from the plurality according to a pattern analysis by dividing each cluster into chains of sequential request entities that exclude request entities for which the pattern analysis indicates are auto-complete communications and examining the chains of each cluster and removing a selected cluster according to the examination; and
   identifying remaining clusters as having an auto-complete communication pattern.

2. The method of claim 1, wherein grouping comprises grouping request entities that share at least one of an identical request method, identical request domain, and identical number of request key-value pairs into the same cluster.

3. The method of claim 1, wherein each request entity includes a uniform resource locator (URL) and wherein grouping comprises:
   determining an edit distance between an URL of a request entity under consideration for inclusion in a cluster and a longest URL of a request entity in that cluster; and
   grouping the request entity under consideration in that cluster only if the edit distance is within a predetermined threshold.

4. The method of claim 1, wherein:
   dividing comprises assembling, from each cluster, chains of consecutive request entities containing fields differing by more than one character and less than the predetermined threshold;
   examining comprises distinguishing at least one of a cluster that contains chains without at least one field in common, a cluster that contains chains having a common field of zero length, a cluster that contains a chain having a repeating sequence of queries, and a cluster that contains less than a predetermined threshold percentage of request entities included in a chain;
   removing comprises removing a distinguished cluster; and
   identifying comprises identifying a chain of a remaining cluster as having an auto-complete communication pattern.

5. The method of claim 4, wherein assembling comprises:
   comparing a prior request entity with its subsequent request entity;
   marking only those fields of the subsequent request entity having an edit distance greater than one and less than a predetermined threshold with a marked field of the request entity;
   if fields of the subsequent request entity are marked, including the subsequent request entity in a chain with the prior request entity and repeating the steps of comparing and marking with the subsequent request entity being treated as the prior request entity in an attempt to grow the chain with another subsequent request entity; and if no fields are marked, ending a chain with the prior request entity and repeating the steps of comparing and marking with the subsequent request entity being treated as the prior request entity in an attempt to start another chain.

6. A non-transitory computer readable medium having instructions stored thereon that when executed by a processing resource implement a system comprising:

a cluster engine configured to group a sequence of request entities into a plurality of clusters according to a criterion;

a chain engine configured to divide each cluster into chains of consecutive request entities containing fields differing by more than one character and less than a predetermined threshold;

a remove engine configured to remove clusters from the plurality according to at least one a cluster size, a cluster timing; and a chain analysis; and an identification engine configured to identify a chain of a remaining cluster as having an auto-complete communication pattern.

7. The medium of claim 6, wherein the cluster engine is configured to group request entities that share at least one of an identical request method, identical request domain, and identical number of request key-value pairs into the same cluster.

8. The medium of claim 6, wherein for each cluster, the chain engine is configured to divide the request entities into chains wherein consecutive chains are broken by a request entity not having a field that differs by more than one character but less than the threshold with a field of a preceding or subsequent request entity.

9. The medium of claim 8, wherein the remove engine is configured to remove a selected cluster where the chain analysis reveals at least one of:

the cluster contains chains without at least one field in common;

the cluster that contains chains having a common field of zero length;

the cluster contains a chain having a repeating sequence of queries; and the cluster contains less than a predetermined threshold percentage of request entities included in a chain.

10. A system for identifying an auto-complete communication pattern, the system comprising a processing resource in communication with a computer readable medium, wherein the computer readable medium contains a set of instructions and wherein the processing resource is designed to carry out the set of instructions to:

group the request entities into a plurality of clusters according to a criterion;

remove clusters from the plurality according to a pattern analysis by dividing each cluster into chains of sequential request entities that exclude request entities for which the pattern analysis indicates are auto-complete communications and examining the chains of each cluster and removing a selected cluster according to the examination; and identify remaining clusters as having an auto-complete communication pattern.

11. The system of claim 10, wherein the processing resource is designed to carry out the set of instructions to group by grouping request entities that share at least one of an identical request method, identical request domain, and identical number of request key-value pairs into the same cluster.

12. The system of claim 10, wherein each request entity includes a uniform resource locator (URL) and wherein the processing resource is designed to carry out the set of instructions to group by:

determining an edit distance between an URL of a request entity under consideration for inclusion in a cluster and a longest URL of a request entity in that same cluster; and grouping the request entity under consideration in that cluster only if the edit distance is within a predetermined threshold.

13. The system of claim 12, wherein:

dividing comprises assembling, from each cluster, chains of consecutive request entities containing fields differing by more than one character and less than the predetermined threshold; and examining comprises distinguishing at least one of a cluster that contains chains without at least one field in common, a cluster that contains chains having a common field of zero length, a cluster that contains a chain having a repeating sequence of queries, and a cluster that contains less than a predetermined threshold percentage of request entities included in a chain;

removing comprises removing a distinguished cluster; and identifying comprises identifying the chains of remaining clusters as having an auto-complete communication pattern.

* * * * *